United States Patent
Bajar et al.

(10) Patent No.: US 8,400,970 B2
(45) Date of Patent: Mar. 19, 2013

(54) SYSTEM AND METHOD FOR SECURING A PERSONALIZED INDICIUM ASSIGNED TO A MOBILE COMMUNICATIONS DEVICE

(75) Inventors: David Bajar, Kitchener (CA); Herb A. Little, Waterloo (CA); James Godfrey, Waterloo (CA); Allan David Lewis, New Dundee (CA); Wen Gao, Waterloo (CA); Marc Plumb, Kitchener (CA); Michael Kenneth Brown, Kitchener (CA); Graeme Whittington, Waterloo (CA); Neil Patrick Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 182 days.

(21) Appl. No.: 13/091,206

(22) Filed: Apr. 21, 2011

(65) Prior Publication Data

US 2011/0211530 A1   Sep. 1, 2011

Related U.S. Application Data

(63) Continuation of application No. 10/996,702, filed on Nov. 24, 2004, now Pat. No. 7,961,883.

(51) Int. Cl.
*H04W 12/06* (2009.01)
*H04W 4/00* (2009.01)

(52) U.S. Cl. .................................................. 370/328
(58) Field of Classification Search .................. 370/310, 370/328; 455/403, 410, 411, 422.1, 435.1
See application file for complete search history.

(56) References Cited

U.S. PATENT DOCUMENTS

| | | | |
|---|---|---|---|
| 5,668,876 A * | 9/1997 | Falk et al. | 380/271 |
| 6,223,289 B1 * | 4/2001 | Wall et al. | 726/16 |
| 6,954,790 B2 | 10/2005 | Forslow | |
| 7,050,993 B1 * | 5/2006 | Piikivi et al. | 705/27.1 |
| 7,216,231 B2 * | 5/2007 | Gehrmann | 713/171 |
| 7,353,388 B1 * | 4/2008 | Gilman et al. | 713/168 |
| 7,373,515 B2 * | 5/2008 | Owen et al. | 713/182 |
| 8,295,808 B2 * | 10/2012 | Gehrmann et al. | 455/411 |
| 2002/0035591 A1 | 3/2002 | Kimura | |
| 2002/0035699 A1 | 3/2002 | Crosbie | |
| 2002/0069278 A1 | 6/2002 | Forslow | |

(Continued)

FOREIGN PATENT DOCUMENTS

EP   1821495   8/2007

OTHER PUBLICATIONS

USPTO, Office Action, U.S. Appl. No. 10/996,702, Oct. 7, 2008, 31 pgs.

(Continued)

*Primary Examiner* — Chi Pham
*Assistant Examiner* — Robert Lopata
(74) *Attorney, Agent, or Firm* — The Danamraj Law Group, P.C.

(57) ABSTRACT

In one embodiment, a method operable on a mobile communications device is disclosed, the method comprising generating an authentication key for securing a personalized indicium assigned to the mobile communications device, wherein the personalized indicium comprises a Personal Information Number (PIN) that is mapped to at least one identifier associated with the mobile communications device; transmitting a registration request to a network node operable with a wireless network, the registration request having a registration request payload including the authentication key; receiving a challenge message from the network node, the challenge message generated when the network node detects a change of the IP address associated with the mobile communications device, and responsive to receiving the challenge message, executing a challenge response including an authentication value of a challenge string transmitted in the challenge message, wherein the authentication value is created using the authentication key.

12 Claims, 7 Drawing Sheets

U.S. PATENT DOCUMENTS

| | | | |
|---|---|---|---|
| 2002/0169966 | A1 | 11/2002 | Nyman et al. |
| 2002/0194499 | A1* | 12/2002 | Audebert et al. ............. 713/201 |
| 2003/0211841 | A1 | 11/2003 | Castrogiovarni et al. |
| 2004/0097217 | A1 | 5/2004 | McClain |
| 2004/0123137 | A1 | 6/2004 | Yodaiken |
| 2006/0256968 | A1 | 11/2006 | Lemasson |
| 2007/0274524 | A1 | 11/2007 | Ksontini et al. |
| 2008/0040608 | A1 | 2/2008 | Li et al. |

OTHER PUBLICATIONS

USPTO, Office Action, U.S. Appl. No. 10/996,702, Jun. 3, 2009, 21 pgs.
USPTO, Office Action, U.S. Appl. No. 10/996,702, Sep. 16, 2009, 18 pgs.
USPTO, Office Action, U.S. Appl. No. 10/996,702, Dec. 16, 2009, 2 pgs.
USPTO, Office Action, U.S. Appl. No. 10/996,702, Apr. 6, 2010, 19 pgs.
USPTO; Office Action, U.S. Appl. No. 11/303,296; Aug. 3, 2009, 30 pgs.
USPTO; Office Action, U.S. Appl. No. 11/303,296, Oct. 19, 2009, 29 pgs.
CIPO; Office Action; Application No. 2,527,767; Jul. 27, 2009; 3 pgs.
EPO; Search Report; Application No. 04257296.6; Jun. 9, 2005; 4 pgs.
EPO; Search Report; Application No. 07109669.7; Nov. 7, 2007; 6 pgs.
EPO; Communication Pursuant to Article 94(3) EPC; Application No. 07109669.7; Feb. 13, 2009; 3 pgs.
USPTO; Office Action, U.S. Appl. No. 11/303,296; Feb. 9, 2009; 35 pgs.
A. Menezes et al.; Handbook of Applied Cryptography; Chapter 10; Identity and Entity Authentication; CRC Press, Inc.; Dec. 1996; 41 pgs.
IP in Wireless Networks; Excerpt: Section 15.3; Prentice Hall; Jan. 31, 2003.
Mobility and Security Management; The GSM System; 74 pgs.
TIPHON Release 4; Service Independent Requirements Definition; Threat Analysis; ETSI; Technical Report; Apr. 2001; 49 pages.
CIPO, Notice of Allowance, Application No. 2,527,767, Jun. 8, 2010, 2 pgs.
EPO, Decision to Grant, U.S. Appl. No. 04257296.6, May 10, 2007, 1 pg.
EPO, Communication Pursuant to Article 94(3) EPC, U.S. Appl. No. 27109669.7, Jun. 25, 2008, 2 pgs.
USPTO, Notice of Appeal, Panel Decision, U.S. Appl. No. 10/996,702, Jun. 25, 2010, 2 pgs.
USPTO, Notice of Allowance, U.S. Appl. No. 10/996,702, Feb. 2, 2011, 6 pgs.
USPTO, Notice of Appeal, Panel Decision, U.S. Appl. No. 11/303,296, Feb. 5, 2010, 2 pgs.
USPTO, Notice of Allowance, U.S. Appl. No. 11/303,296, Mar. 26, 2010, 15 pgs.

* cited by examiner

SYSTEM AND METHOD FOR SECURING A PERSONALIZED INDICIUM ASSIGNED TO A MOBILE COMMUNICATIONS DEVICE

CROSS-REFERENCE TO RELATED APPLICATIONS

This non-provisional application is a continuation application of U.S. patent application Ser. No. 10/996,702, entitled "SYSTEM AND METHOD FOR SECURING A PERSONALIZED INDICIUM ASSIGNED TO A MOBILE COMMUNICATIONS DEVICE," filed Nov. 24, 2004, which discloses subject matter related to the subject matter disclosed in the following commonly owned co-pending patent applications: (i) "SYSTEM AND METHOD FOR PORTING A PERSONALIZED INDICIUM ASSIGNED TO A MOBILE COMMUNICATIONS DEVICE," filed Nov. 24, 2004, application Ser. No. 10/997,555; (ii) "SYSTEM AND METHOD FOR ASSIGNING A PERSONALIZED INDICIUM TO A MOBILE COMMUNICATIONS DEVICE," filed Nov. 24, 2004, application Ser. No. 10/997,577, issued as U.S. Pat. No. 7,356,330; and (iii) "SYSTEM AND METHOD FOR MANAGING SECURE REGISTRATION OF A MOBILE COMMUNICATIONS DEVICE," filed Nov. 24, 2004, application Ser. No. 10/996,925, issued as U.S. Pat. No. 7,738,868. The entire content of each of the foregoing applications is incorporated herein by reference.

FIELD OF THE APPLICATION

The present patent application generally relates to mobile communication devices. More particularly, and not by way of any limitation, the present patent application is directed to a system and method for securing a personalized indicium assigned to a mobile communications device that is operable to be disposed in a wireless packet data service network.

BACKGROUND AND SUMMARY

It is becoming commonplace to use wireless packet data service networks for effectuating data sessions with mobile communications devices. In some implementations, unique indicia such as Personal Information Numbers or PINs are assigned to the devices in order to facilitate certain aspects of service provisioning, e.g., security, validation and service authentication, et cetera. In such scenarios, it becomes imperative that no two devices have the same indicium (i.e., collision). Further, such PIN indicia are mapped to individual Internet Protocol (IP) addresses used in packet-switched networks so that a mobile communications device continues to send and receive messages even if its IP address is changed for some reason. For example, wireless carriers may dynamically assign an IP address to a data-enabled mobile device, and if that device is out of coverage, the previously assigned IP address is reclaimed and recycled for another device requesting service.

Because of the mapping between IP addresses and PIN indicia assigned to the devices, a potential security issue such as, e.g., "identity theft" arises, however. By way of illustration, an attacker could create a packet with the PIN assigned to a legitimate device and transmit it from a different IP address that claims to be the legitimate device, i.e., one having the authorized PIN. This may cause routing of the messages intended for the legitimate device to the attacker's IP address (i.e., a Denial of Service or DoS attack).

In one embodiment, a mobile communications device comprises a processor configured to control at least one of a plurality of sub-systems for communicating with a network node operable with a wireless network. The processor is further configured to control at least one of the plurality of sub-systems for generating an authentication key for securing a personalized indicium assigned to the mobile communications device, wherein the personalized indicium comprises a Personal Information Number (PIN) that is mapped to at least one identifier associated with the mobile communications device. The processor is further configured to control at least one of the plurality of sub-systems for transmitting a registration request to the network node, the registration request having a registration request payload including the authentication key. The processor is further configured to control at least one of the plurality of sub-systems for receiving a challenge message from the network node, the challenge message generated when the network node detects a change of the IP address associated with the mobile communications device. The processor is further configured to control at least one of the plurality of sub-systems for executing a challenge response to the challenge message, the challenge response including an authentication value of a challenge string transmitted in the challenge message, wherein the authentication value is created using the authentication key.

In another embodiment, a method operable on a mobile communications device is disclosed, the method comprising generating an authentication key for securing a personalized indicium assigned to the mobile communications device, wherein the personalized indicium comprises a Personal Information Number (PIN) that is mapped to at least one identifier associated with the mobile communications device; transmitting a registration request to a network node operable with a wireless network, the registration request having a registration request payload including the authentication key; receiving a challenge message from the network node, the challenge message generated when the network node detects a change of the IP address associated with the mobile communications device, and responsive to receiving the challenge message, executing a challenge response including an authentication value of a challenge string transmitted in the challenge message, wherein the authentication value is created using the authentication key.

In another embodiment, a scheme is provided for securing a personalized indicium such as a Personal Information Number (PIN) assigned to a mobile communications device. Upon detecting at a network node that an address associated with the mobile communications device has changed, a challenge-and-response procedure is negotiated between the mobile communications device and the network node for authenticating the personalized indicium using a shared authentication key. In another embodiment, a method is disclosed which comprises: detecting at a network node that an address associated with packets from a mobile communications device has changed, wherein the mobile communications device's personalized indicium comprises a PIN that is mapped to at least one identifier (e.g., a device identifier or a subscriber identifier) relating to the mobile communications device; responsive to the detecting, issuing a challenge message to the mobile communications device by the network node, wherein a challenge response is operable to be generated by the mobile communications device using an authentication key; and based on the challenge response from the mobile communications device, determining at the network node whether the PIN is legitimately bound to the mobile communications device.

In another embodiment, a mobile communications device is disclosed which comprises: logic means operable to generate an authentication key for transmitting in a registration request to a network node interfaced with a wireless network, the authentication key for securing a personalized indicium assigned to the mobile communications device, wherein the personalized indicium comprises a PIN that is mapped to at least one identifier relating to the mobile communications device; and logic means operable to execute a challenge response when challenged by a challenge message from the network node, the challenge response including an authentication value (e.g., a signature) of a challenge string transmitted in the challenge message, wherein the authentication value is created using the authentication key. In yet another embodiment, a network system is disclosed for securing a personalized indicium assigned to a mobile communications device, which comprises: means for detecting at a network node that an address of packets from the mobile communications device has changed, wherein the mobile communications device's personalized indicium comprises a PIN that is mapped to at least one identifier relating to the mobile communications device; means, operable responsive to the detecting, for issuing a challenge message to the mobile communications device, wherein a challenge response is operable to be generated by the mobile communications device using an authentication key; and means, operable responsive to the challenge response from the mobile communications device, for determining at the network node whether the PIN is legitimately bound to the mobile communications device.

BRIEF DESCRIPTION OF THE DRAWINGS

A more complete understanding of the embodiments of the present patent application may be had by reference to the following Detailed Description when taken in conjunction with the accompanying drawings wherein.

DETAILED DESCRIPTION OF THE DRAWINGS

Figure 1:
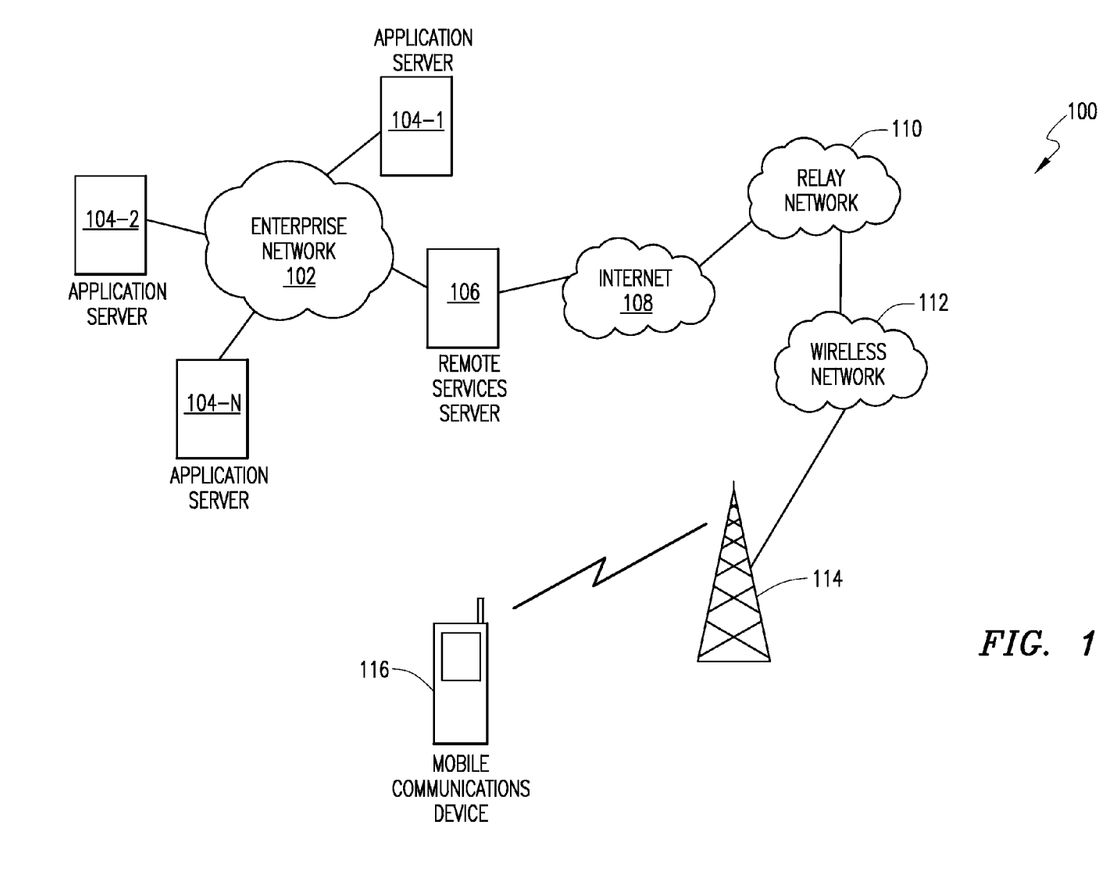
FIG. 1 depicts an exemplary network environment including a wireless packet data service network wherein an embodiment of the present patent application may be practiced.

A system and method of the present patent application will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 including a wireless packet data service network 112 wherein an embodiment of the present patent application may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, i=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. In another embodiment, the infrastructure of the trusted relay network 110 may be integrated with the wireless packet data service network 112, whereby the functionality of the relay infrastructure, certain aspects of which will be described in greater detail below, is consolidated as a separate layer within a "one-network" environment. Additionally, by way of example, MCD 116 may be a data-enabled mobile handheld device capable of receiving and sending messages, web browsing, interfacing with corporate application servers, et cetera, regardless of the relationship between the networks 110 and 112. Accordingly, a "network node" may include both relay functionality and wireless network infrastructure functionality in some exemplary implementations.

For purposes of the present patent application, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation (3G) network. As will be seen hereinbelow, the embodiments of the present patent application for securing a personalized indicium such as a PIN with respect to MCD 116 will be described regardless of any particular wireless network implementation.

Figure 2:
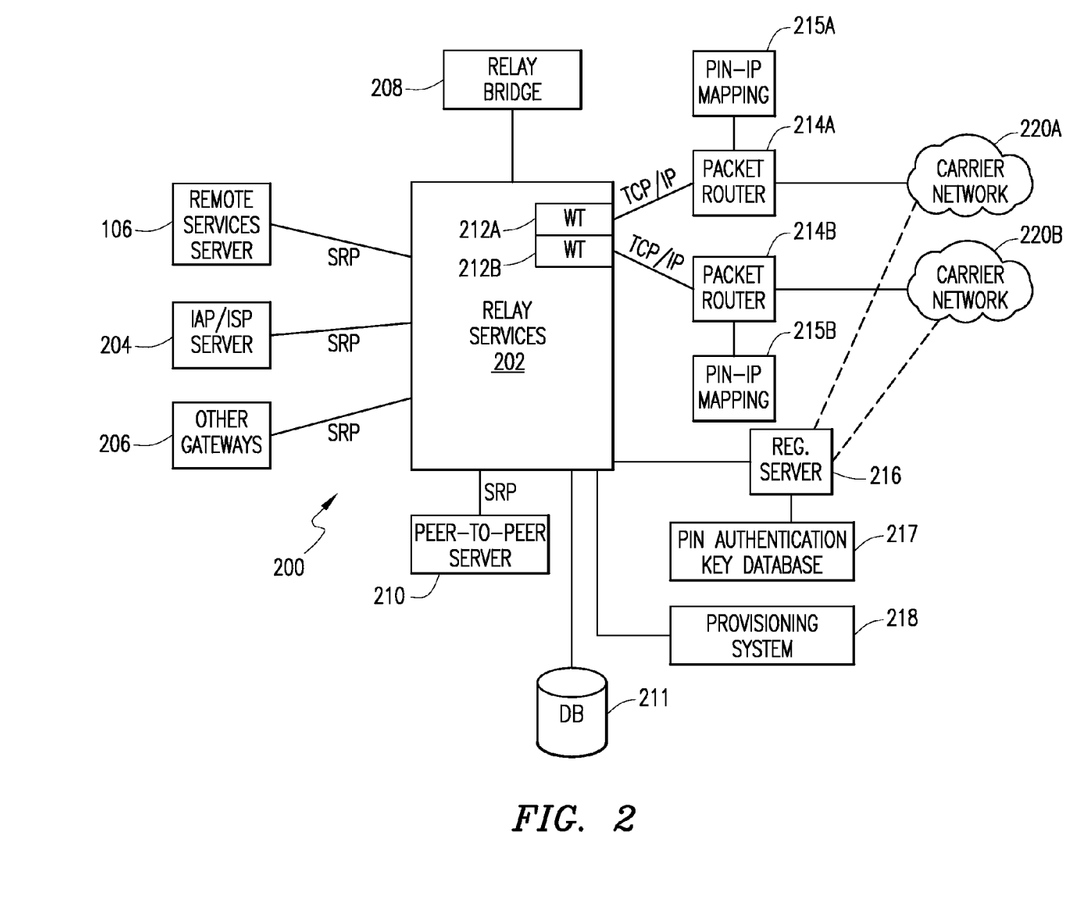
FIG. 2 depicts additional details of an exemplary relay network operable with a mobile communications device in accordance with an embodiment.

FIG. 2 depicts additional details of an exemplary relay network infrastructure 200 operable as part of relay network 110 interfacing with the wireless packet data service network 112 described above. A relay services node 202 is operable, at least in part, for providing connectivity between MCDs and various data application services (enterprise services, external IP data services, et cetera), regardless of the geographic location of the MCDs and their respective wireless carriers. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which MCD messages can flow to and from services, irrespective of the region where the MCD is in.

Communication between the relay services node 202 and various application gateways and servers is effectuated using any suitable protocol, e.g., Server Relay Protocol (SRP), preferably over IP links. By way of illustration, remote services server 106 associated with the enterprise network 102 (shown in FIG. 1) communicates with the relay using SRP for effectuating internal data services with respect to the enterprise's mobile subscribers. Likewise, reference numerals 204 and 206 refer to external application gateways, such as Internet Service Provider (ISP) or Internet Access Provider (IAP) servers, and other gateways, respectively, which are also interfaced with the relay node 202 using SRP. A peer-to-peer server 210 may also be provided in operable connection with the relay node 202 for handling peer-level messaging between two MCDs using their respective PIN indicia.

Additionally, a database 211 may be provided in operable connection with the relay node 202 for handling and managing MCD location information. Preferably, this location information is stored by PIN indicia of the MCDs, which may be programmed into the devices at the time of manufacture or dynamically assigned afterwards, wherein the records maintain a particular device's last known location. A registration server 216 is operable for providing registration services for MCDs when they are initially activated or when the user re-registers due to moving to a different wireless network coverage area. In one implementation, the location information of registration server 216 may be programmed into an MCD. When the MCD registers successfully, registration server 216 is operable to provide the serving relay node's location, whereupon data sessions may be engaged by the MCD. Further, a database 217 is associated with the registration server 216 for storing a PIN authentication key provided by the MCD during its registration with the network. As will be seen in greater detail below, the PIN authentication key may be used by the network logic in securing the PIN indicium of an MCD so that it can be ensured that packets are delivered to or received from a legitimate MCD (i.e., with a valid PIN) instead of a device that has illegally accessed or stolen a PIN or managed to spoof a PIN.

One or more wireless transport (WT) interfaces are provided as part of relay services node 202 for connecting with wireless carrier networks that service MCDs. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B. To facilitate accurate routing, packet routers 214A, 214B are provided with PIN-IP mapping tables 215A and 215B that are used to route packets over IP networks. When a WT addresses a packet by PIN, the corresponding packet router interrogates the mapping table to look up and retrieve the current IP address for the MCD. In one implementation, the packet routers are operable to update the IP address of the MCD in the mapping tables every time they receive a packet. In another implementation, the IP-PIN mapping tables may be updated as necessary, e.g., when the IP address of an MCD is changed because it is dynamically assigned and may be reclaimed after the MCD has roamed out of a serving area.

In accordance with one embodiment, service logic provided with the WT modules is operable to initiate a challenge-response procedure with an MCD that has changed its IP address for some reason. Alternatively, the service logic is responsive to a challenge-response handshake request from an MCD on its own. Essentially, the challenge-response sequence is comprised of the WT generating a challenge message when an IP address change is detected by the packet router, or when it is requested by the MCD. In order for the packet router to communicate its IP-PIN mapping interrogation results to the WT logic, a message packet is transmitted in a suitable form that includes the information necessary for triggering the challenge generation service. In one exemplary implementation, the format of the message packet may be as follows:

<Packet-Type> <Version> <Length> <Device PIN>
        <Device IP> <IP Change/Update flag> <Data> where the Device PIN and Device IP fields may be populated by the values supplied by the MCD and not necessarily based on the IP-PIN mapping table. If the IP address for a particular PIN differs from the value in the mapping table, the IP Change/Update flag will be set accordingly, indicating that the WT logic is required to start a challenge-response handshake in order to validate the PIN and, if successful, update the IP mapping subsequently.

Continuing to refer to FIG. 2, registration server 216, which handles administration and registration services for MCDs, may also be provided with separate WT and packet routing for interfacing with the carrier networks 220A, 220B, although not specifically shown. A provisioning system (PRV) 218 may be co-located or otherwise associated with the relay services node 202 for setting up and managing various service providers (i.e., carrier networks), subscribers, MCD manufacturers, resellers, and other entities in order to support any number of service and market differentiation requirements. Additionally, the provisioning system 218 may include logic for provisioning personalized indicia (e.g., PIN assignment and management) with respect to the MCDs. Also, subscriber validation logic may be provided as part of the provisioning system 208.

One skilled in the art should appreciate that the various databases and service logic processing set forth above with respect to the relay network may be realized in suitable hardware, firmware and/or firmware logic blocks or in combination thereof. Furthermore, as alluded to before, the functionality of the relay network may also be integrated within a wireless carrier network, whereby a "network node" may generally comprise the relay layer functionality as well.

Figure 3:
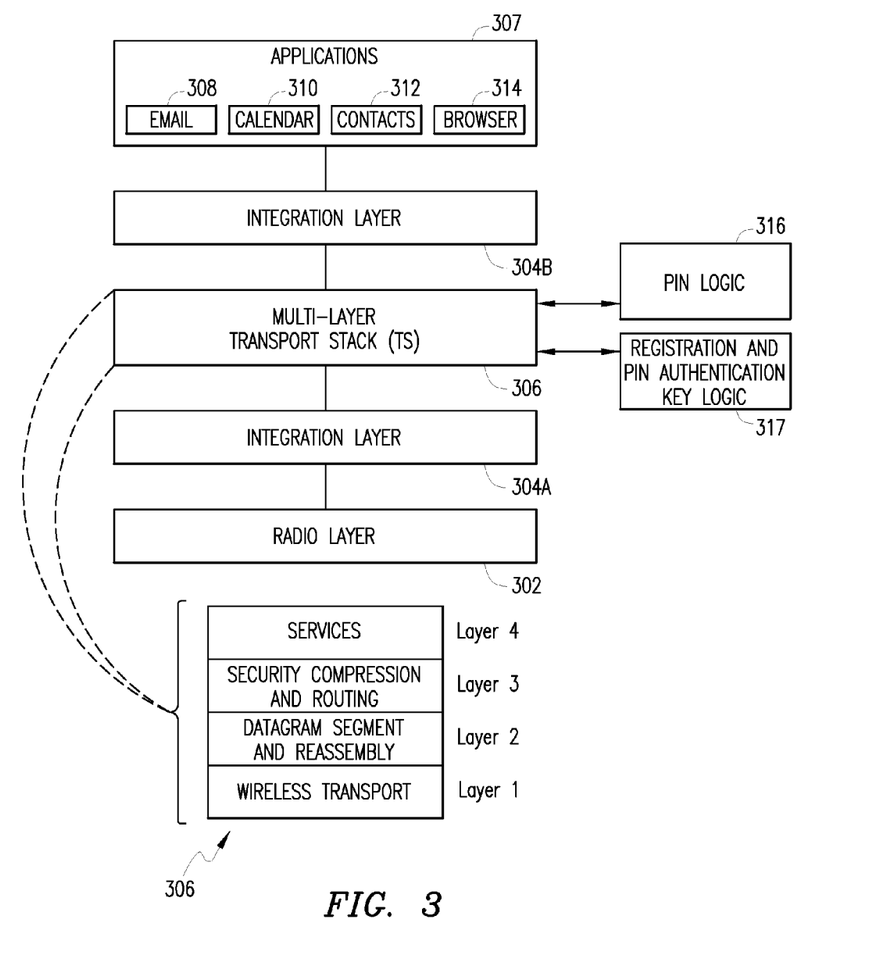
FIG. 3 depicts a software architectural view of a mobile communications device according to one embodiment.

FIG. 3 depicts a software architectural view of a mobile communications device operable according to one embodiment. A multi-layer transport stack (TS) 306 is operable to provide a generic data transport protocol for any type of corporate data, including email, via a reliable, secure and seamless continuous connection to a wireless packet data service network. As illustrated in the embodiment of FIG. 3, an integration layer 304A is operable as an interface between the MCD's radio layer 302 and the transport stack 306. Likewise, another integration layer 304B is provided for interfacing between the transport stack 306 and the user applications 307 supported on the MCD, e.g., email 308, calendar/scheduler 310, contact management 312 and browser 314. Although not specifically shown, the transport stack 306 may also be interfaced with the MCD's operating system. In another implementation, the transport stack 306 may be provided as part of a data communications client module operable as a host-independent virtual machine on a mobile device.

The bottom layer (Layer 1) of the transport stack 306 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

A PIN logic module 316 provided as part of the MCD's software environment is disposed in operable communication with the transport stack 306 as well as the OS environment. In one embodiment, the PIN logic module 316 comprises logic operable to request a PIN indicium from the provisioning network in a dynamic assignment. Alternatively, the PIN logic may include storage means for storing a PIN that is encoded during manufacture. Regardless of the PIN assignment mechanism, once a PIN is persistently associated with an MCD, it is bound to the MCD's at least one of a device identifier and a subscriber identifier (collectively, "identifier") such as, e.g., International Mobile station Equipment Identity (IMEI) parameters, International Mobile Subscriber Identity (IMSI) parameters, Electronic Serial Number (ESN) parameters, Mobile Identification Number (MIN) parameters, et cetera, that are hard-coded into MCDs depending on the wireless network technologies and protocols.

Continuing to refer to FIG. 3, a registration and PIN authentication logic module 317 provided as part of the MCD's software environment is disposed in operable communication with the transport stack 306 as well as the OS environment for effectuating registration procedures and PIN authentication services (e.g., generation of a PIN authentication key for transmission via a registration request to the network, generation of an authentication value, e.g., a digital signature, in a challenge response, et cetera).

Figure 4:
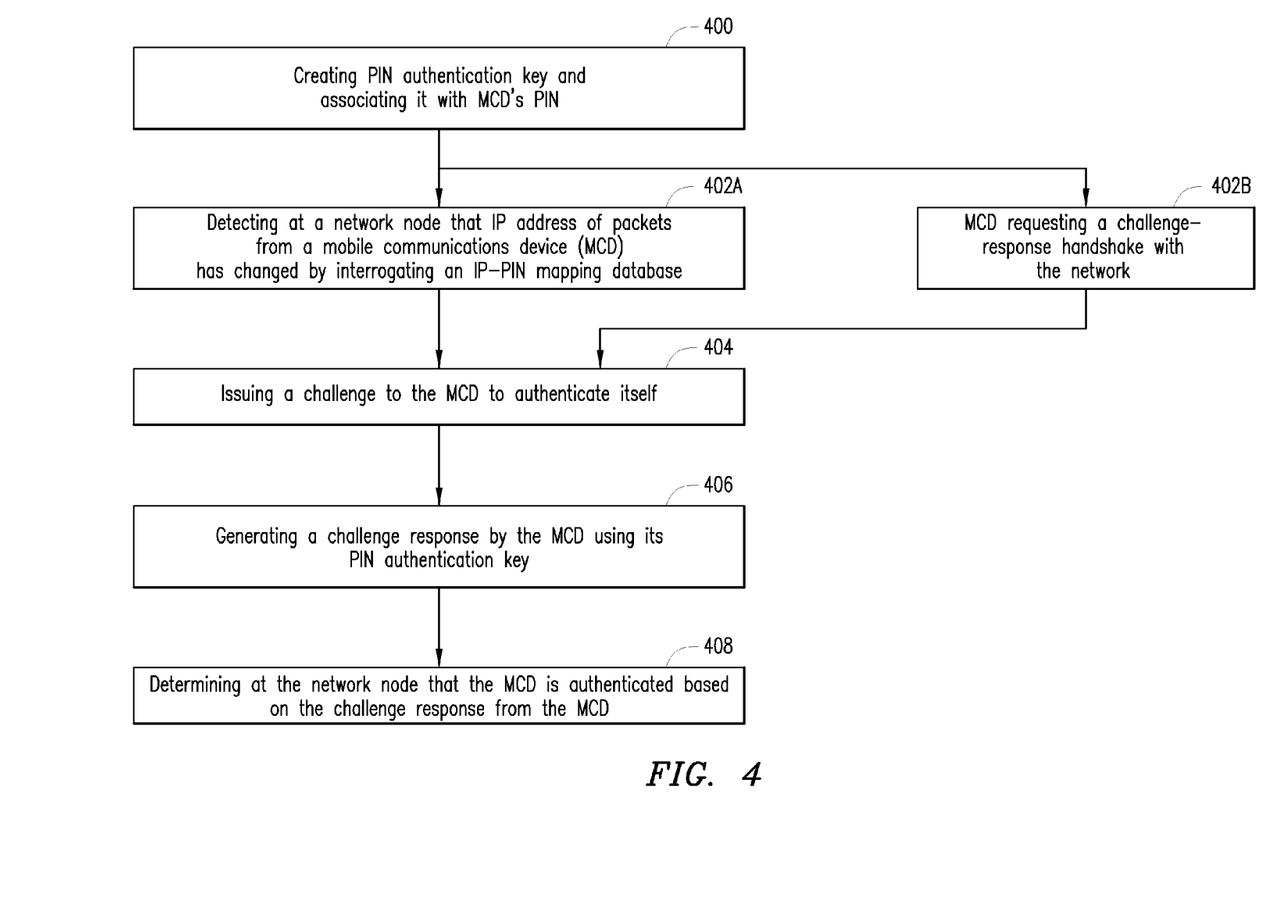
FIG. 4 depicts a flowchart of an embodiment for securing a PIN indicium assigned to a mobile communications device.

FIG. 4 depicts a flowchart of an embodiment for securing a PIN indicium assigned to an MCD. Once the MCD is identified with a PIN, it is operable to generate a PIN authentication key for communication to the relay network as part of a registration request's payload. Upon receiving the key, the registration server stores it in the database to which a WT module has access, and will permanently associate it with the PIN (block 400). Subsequent registration requests may therefore have to specify the same PIN authentication key on each request or they will be rejected, although a "downgrade" provision can allow a subscriber to clear the key within a time window from the time it is first created.

Two situations are possible where the service logic of the relay network may be required to ensure the authenticity of an MCD's PIN. When the MCD's IP address is changed for some reason, the packets transmitted to the relay network node have a new IP address as the source address, which is detected by interrogating an IP-PIN mapping database (block 402A). As described previously, the packet routers of the network node may be engaged in the detection process. Alternatively, the MCD may request on its own a challenge-response handshake (i.e., a challenge-response protocol sequence) with the relay network because, e.g., its dynamic IP address may have changed (block 402B). The network logic is then operable to issue a challenge to the MCD to authenticate itself (block 404). A challenge response is then generated by the MCD using its PIN authentication key (block 406), which is transmitted to the network. Based on the challenge response from the MCD, the network service logic is operable to determine whether the MCD is authenticated, i.e., the PIN is legitimately bound to the MCD (block 408).

Figure 5:
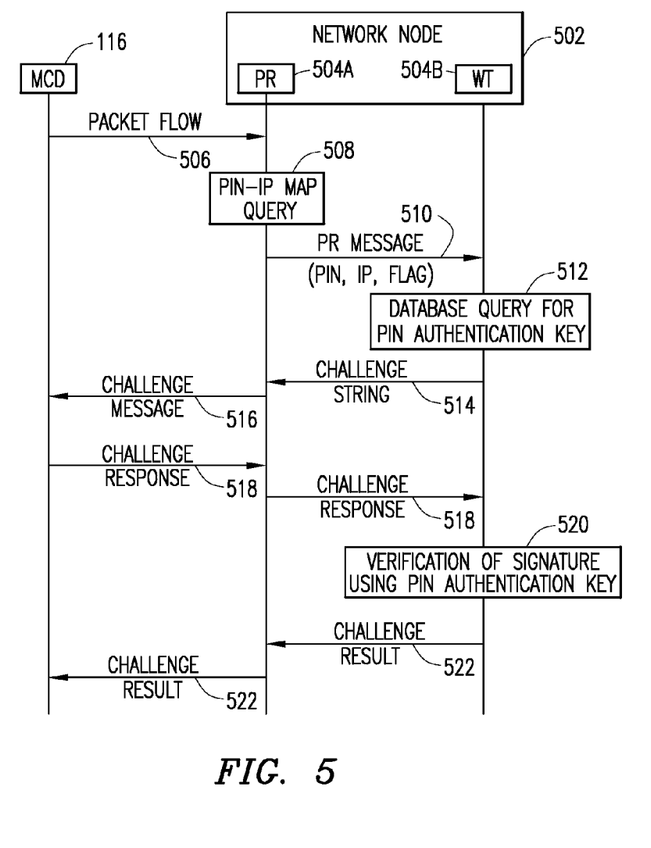
FIG. 5 depicts a message flow diagram with respect to an exemplary secure PIN mechanism according to one embodiment.

FIG. 5 depicts a message flow diagram with respect to an exemplary secure PIN mechanism according to one implementation. A network node 502 including packet router (PR) functionality 504A and WT functionality 504B is provided to be illustrative of the infrastructure of a generalized network, which can be a wireless network, a relay network, or a combination of both, wherein the secure PIN functionality described above is realized. Reference numeral 506 refers to packets with a source IP address that is different from the IP address known to the network service logic as being assigned to MCD 116. Alternatively, reference numeral 506 may refer to a challenge request packet flow from MCD 116 in accordance with a Control Message Protocol (CMP). A database query 508 of a PIN-IP mapping table is performed at PR 504A, which determines that the source IP address corresponding to the PIN has changed. A packet router message 510 is then provided to WT 504B, which includes the new IP address, MCD's PIN and a flag indicative of the condition that the source IP has changed. In response thereto, WT 504B effectuates a database query 512 to obtain an authentication key that corresponds to the MCD's PIN, whereupon a challenge string (e.g., including a random number and the device's new IP address) 514 is generated. An encrypted challenge message 516 containing the challenge string is then transmitted from PR 504A to MCD 116, which generates a challenge response 518 using its shared PIN/IP authentication key for digitally signing the response packet. In one embodiment, MCD 116 is operable to use any known hashing algorithm on the challenge string to generate a hash value that is provided as part of the challenge response 518. Upon receiving the challenge response from MCD 116, PR 504A forwards it to WT 504B wherein the service logic is operable to compare the received response with an expected response in order to verify the authentication value (block 520). A challenge result 522 is then propagated back to MCD 116 from the network node 502, the result being indicative of whether the verification process 520 was a success (i.e., a positive acknowledgment that the device/PIN combination is authentic and packet flow may commence) or a failure (i.e., a negative acknowledgment which may result in locking out the device).

Figure 6:
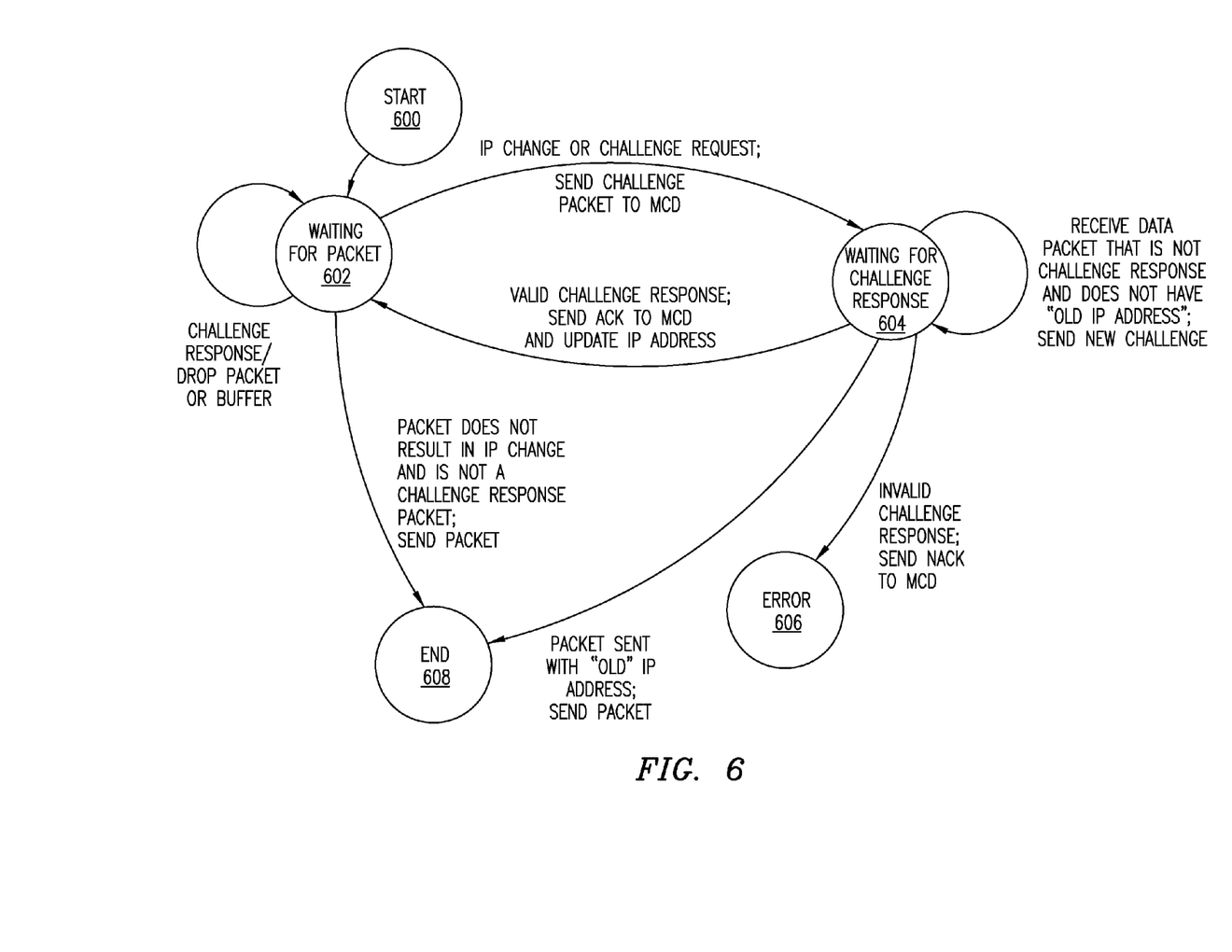
FIG. 6 depicts a state diagram according to one embodiment for securing a mobile communications device's PIN indicium.

A state diagram relating to the challenge-response procedure embodiment set forth hereinabove is shown in FIG. 6. From a Start state 600, the logic transitions to a Waiting for Packet state 602 operable to process packet flow from an MCD. When a packet with a changed IP address or a challenge request arrives, the logic transitions to a Waiting for Challenge Response state 604 and a challenge packet is transmitted to the MCD. In one implementation, while the logic waits for the response, the packets from the MCD may be dropped unless a buffering scheme is provided. Upon receiving a valid challenge response, an acknowledgment is provided to the MCD and the IP address thereof is suitably updated, whereupon the logic transitions back to Waiting for Packet state 602. If an incoming packet does not result in IP address change and is not a challenge response packet, the packet is forwarded to the network infrastructure for subsequent processing and routing. In that case, the service logic simply transitions to an End state 608. If an invalid challenge response is provided by the MCD, a negative acknowledgment (i.e., error) is transmitted to the MCD, and the service logic subsequently transitions to an Error state 606.

Those skilled in the art should appreciate that given the possibility of lost packets and attacks by third parties, it may become necessary that the challenge-response process be bounded in time. While an IP address update is in progress, the MCD may be instructed to cease transmitting any packets to the network. Accordingly, an incomplete challenge-response procedure could result in the device being blocked. Upon successful validation/acknowledgment from the network, the MCD may commence sending the packets again.

Figure 7:
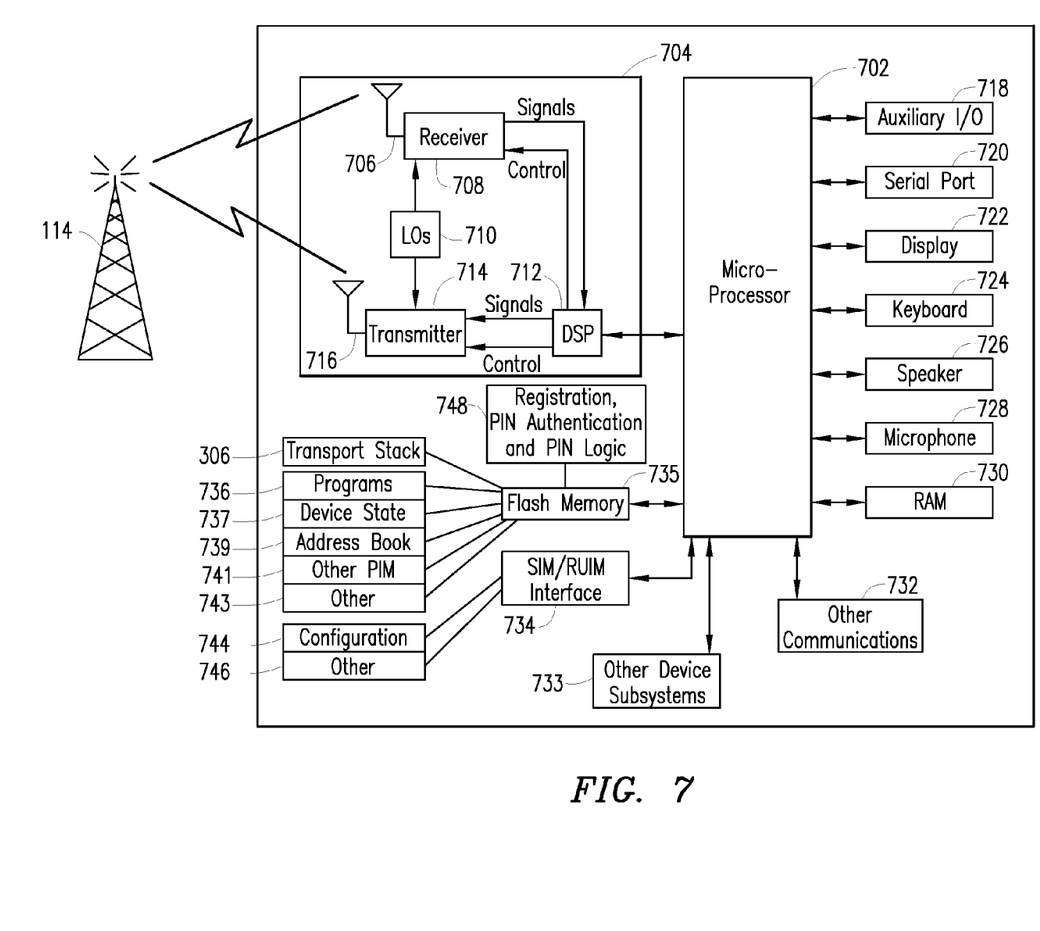
FIG. 7 depicts a block diagram of a mobile communications device according to one embodiment.

FIG. 7 depicts a block diagram of a mobile communications device operable according to one embodiment. It will be recognized by those skilled in the art upon reference hereto that although an embodiment of MCD 116 may comprise an arrangement similar to one shown in FIG. 7, there can be a number of variations and modifications, in hardware, software or firmware, with respect to the various modules depicted. Accordingly, the arrangement of FIG. 7 should be taken as illustrative rather than limiting with respect to the embodiments of the present patent application. A microprocessor 702 providing for the overall control of an embodiment of MCD 116 is operably coupled to a communication subsystem 704 which includes a receiver 708 and transmitter 714 as well as associated components such as one or more local oscillator (LO) modules 710 and a processing module such as a digital signal processor (DSP) 712. As will be apparent to those skilled in the field of communications, the particular design of the communication module 704 may be dependent upon the communications network with which the mobile device is intended to operate. In one embodiment, the communication module 704 is operable with both voice and data communications. Regardless of the particular design, however, signals received by antenna 706 through BS 114 are provided to receiver 708, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 712, and provided to transmitter 714 for digital-to-analog (D/A) conversion, frequency up conversion, filtering, amplification and transmission over the air-radio interface via antenna 716.

Microprocessor 702 also interfaces with further device subsystems such as auxiliary input/output (I/O) 718, serial port 720, display 722, keyboard 724, speaker 726, microphone 728, random access memory (RAM) 730, a short-range communications subsystem 732, and any other device subsystems generally labeled as reference numeral 733. To control access, a Subscriber Identity Module (SIM) or Removable user Identity Module (RUIM) interface 734 is also provided in communication with the microprocessor 702. In one implementation, SIM/RUIM interface 734 is operable with a SIM/RUIM card having a number of key configurations 744 and other information 746 such as identification and subscriber-related data.

Operating system software and transport stack software may be embodied in a persistent storage module (i.e., non-volatile storage) such as Flash memory 735. In one implementation, Flash memory 735 may be segregated into different areas, e.g., storage area for computer programs 736 as well as data storage regions such as device state 737, address book 739, other personal information manager (PIM) data 741, and other data storage areas generally labeled as reference numeral 743. A logic module 748 is provided for storing a PIN assigned to the MCD, dynamically or otherwise, as well as for generating a PIN authentication key for transmission via registration. Also associated therewith is suitable logic for supporting one or more challenge response mechanisms, including generation of authentication values or signatures, and related cryptographic techniques and algorithms.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A mobile communications device comprising:
a processor configured to control at least one of a plurality of sub-systems for communicating with a network node operable with a wireless network;
the processor further configured to control at least one of the plurality of sub-systems for generating an authentication key for securing a personalized indicium assigned to the mobile communications device, wherein the personalized indicium comprises a Personal Information Number (PIN) that is mapped to at least one identifier associated with the mobile communications device;
the processor further configured to control at least one of the plurality of sub-systems for transmitting a registration request to the network node, the registration request having a registration request payload including the authentication key;
the processor further configured to control at least one of the plurality of sub-systems for receiving a challenge message from the network node, the challenge message generated when the network node detects a change of the IP address associated with the mobile communications device,
the processor further configured to control at least one of the plurality of sub-systems for executing a challenge response to the challenge message, the challenge response including an authentication value of a challenge string transmitted in the challenge message, wherein the authentication value is created using the authentication key.

2. The mobile communications device of claim 1, wherein the wireless network is a network selected from the group consisting of a General Packet Radio Service (GPRS) network, an Enhanced Data Rates for Global System for Mobile Communications (GSM) Evolution (EDGE) network, a $3^{rd}$ Generation (3G) network, an Integrated Digital Enhanced Network (IDEN), a Code Division Multiple Access (CDMA) network and a Universal Mobile Telecommunications System (UMTS) network.

3. The mobile communications device of claim 1, wherein the at least one identifier comprises at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

4. The mobile communications device of claim 1, wherein the processor is further configured to control at least one of the plurality of sub-systems for generating a challenge request for transmitting to the network node upon acquiring a new Internet Protocol (IP) address.

5. The mobile communications device of claim 1, wherein the processor is further configured to control at least one of the plurality of sub-systems for ceasing transmission of packets to the network node upon receiving the challenge message.

6. The mobile communications device of claim 5, wherein the processor is further configured to control at least one of the plurality of sub-systems for commencing transmission of packets to the network node upon receiving an acknowledgment from the network node that the PIN is legitimately bound to the mobile communications device.

7. A method operable on a mobile communications device, the method comprising:
- generating an authentication key for securing a personalized indicium assigned to the mobile communications device, wherein the personalized indicium comprises a Personal Information Number (PIN) that is mapped to at least one identifier associated with the mobile communications device;
- transmitting a registration request to a network node operable with a wireless network, the registration request having a registration request payload including the authentication key;
- receiving a challenge message from the network node, the challenge message generated when the network node detects a change of the IP address associated with the mobile communications device, and
- responsive to receiving the challenge message, executing a challenge response including an authentication value of a challenge string transmitted in the challenge message, wherein the authentication value is created using the authentication key.

8. The method according to claim 7, wherein the wireless network is a network selected from the group consisting of a General Packet Radio Service (GPRS) network, an Enhanced Data Rates for Global System for Mobile Communications (GSM) Evolution (EDGE) network, a $3^{rd}$ Generation (3G) network, an Integrated Digital Enhanced Network (IDEN), a Code Division Multiple Access (CDMA) network and a Universal Mobile Telecommunications System (UMTS) network.

9. The method according to claim 7, wherein the at least one identifier comprises at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

10. The method according to claim 7, further comprising generating a challenge request for transmitting to the network node upon acquiring a new Internet Protocol (IP) address.

11. The method according to claim 7, further comprising ceasing transmission of packets to the network node upon receiving the challenge message.

12. The method according to claim 11, further comprising commencing transmission of packets to the network node upon receiving an acknowledgment from the network node that the PIN is legitimately bound to the mobile communications device.

\* \* \* \* \*